United States Patent
Zhou et al.

(10) Patent No.: US 8,369,288 B2
(45) Date of Patent: *Feb. 5, 2013

(54) METHOD AND APPARATUS FOR BEARER PROCESSING

(75) Inventors: Jinyi Zhou, Shenzhen (CN); Lan Liu, Shenzhen (CN); Huadong Hu, Beijing (CN)

(73) Assignee: Huawei Technologies Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,059

(22) Filed: Jan. 20, 2012

(65) Prior Publication Data

US 2012/0122464 A1    May 17, 2012

Related U.S. Application Data

(63) Continuation of application No. 12/770,274, filed on Apr. 29, 2010, which is a continuation of application No. PCT/CN2008/072859, filed on Oct. 28, 2008.

(30) Foreign Application Priority Data

Oct. 29, 2007   (CN) .......................... 2007 1 0165462

(51) Int. Cl.
*H04W 4/00* (2009.01)

(52) U.S. Cl. ........ 370/332; 370/329; 370/331; 455/450; 455/452.2

(58) Field of Classification Search .................. 370/329, 370/338, 389, 328, 331; 455/450, 436, 453, 455/404.1

See application file for complete search history.

(56) References Cited

U.S. PATENT DOCUMENTS

| | | | |
|---|---|---|---|
| 7,911,943 B2 * | 3/2011 | Rasanen et al. | 370/229 |
| 7,912,477 B2 * | 3/2011 | Tamura et al. | 455/452.2 |
| 7,944,813 B1 * | 5/2011 | Hurtta et al. | 370/218 |
| 2007/0019643 A1 * | 1/2007 | Shaheen | 370/389 |
| 2007/0162599 A1 | 7/2007 | Nguyen | |
| 2007/0204050 A1 | 8/2007 | Liu et al. | |
| 2007/0213060 A1 * | 9/2007 | Shaheen | 455/436 |
| 2007/0248064 A1 * | 10/2007 | Shaheen | 370/338 |
| 2007/0258427 A1 * | 11/2007 | Shaheen et al. | 370/338 |
| 2007/0280177 A1 * | 12/2007 | Uusikartano et al. | 370/338 |

(Continued)

FOREIGN PATENT DOCUMENTS

| | | |
|---|---|---|
| CN | 1820461 A | 8/2006 |
| WO | 2007/076729 A1 | 7/2007 |

(Continued)

OTHER PUBLICATIONS

International Search Report issued in corresponding PCT Application No. PCT/CN2008/072859; mailed Feb. 5, 2009.

(Continued)

*Primary Examiner* — Ricky Ngo
*Assistant Examiner* — Rasheed Gidado
(74) *Attorney, Agent, or Firm* — Brinks Hofer Gilson & Lione

(57) ABSTRACT

A bearer processing method is disclosed. The method includes these steps: a system border node receives a Packet Data Protocol (PDP) Context Request initiated by a universal mobile telecommunication system (UMTS); the system border node adjusts a Request Bearer Resource Allocation message of a system architecture evolution (SAE) system or the PDP Context Request of the UMTS according to the received PDP Context Request to map the Bearer Resource Allocation procedure of the SAE system and the Bearer Resource Allocation procedure of the UMTS. The present invention can map the Bearer Resource Allocation procedure of the SAE system and the Bearer Resource Allocation procedure of the UMTS.

16 Claims, 12 Drawing Sheets

U.S. PATENT DOCUMENTS

| | | | |
|---|---|---|---|
| 2008/0075041 A1* | 3/2008 | Jen | 370/329 |
| 2009/0168696 A1 | 7/2009 | Lindstrom et al. | |
| 2010/0067449 A1 | 3/2010 | Chen | |
| 2010/0111060 A1 | 5/2010 | Olsson et al. | |
| 2010/0246533 A1* | 9/2010 | Lundin et al. | 370/332 |

FOREIGN PATENT DOCUMENTS

| | | |
|---|---|---|
| WO | WO 2007/076729 A1 | 7/2007 |
| WO | WO 2009/059532 A1 | 5/2009 |

OTHER PUBLICATIONS

Written Opinion of the International Searching Authority issued in corresponding PCT Application No. PCT/CN2008/072859; issued Feb. 5, 2009.

Office Action issued in corresponding Chinese Patent Application No. 200710165462.9; issued Jun. 4, 2010.

$3^{rd}$ Generation Partnership Project; Technical Specification Group Services and System Aspects; General Packet Radio Service (GPRS); Service Description; Stage 2 (Release 7). 3 GPP. Sep. 2007.

"$3^{rd}$ Generation Partnership Project; Technical Specification Group Services and System Aspects; GPRS E Enhancements for E-UTRAN Access (Release 8)" 3 GPP. Sep. 2007.

Office Action issued in corresponding Chinese Patent Application No. 200710165462.9, mailed Jun. 4, 2010.

Office Action issued in corresponding Chinese Patent Application No. 200710165462.9, mailed Dec. 19, 2011.

Written Opinion of the International Searching Authority issued in corresponding PCT Patent Application No. PCT/CN2008/072859, mailed Feb. 5, 2009.

GSM, "$3^{rd}$ Generation Partnership Project; Technical Specification Group Services and System Aspects; GPRS Enhancements for E-UTRAN Access" (Release 8) 3GPP TS 23.401, V1.2.1, Sep. 2007.

GSM, "$3^{rd}$ Generation Partnership Project; Technical Specification Group Services and System Aspects; General Packet Radio Service (GPRS); Service Description" Stage 2 (Release 7) 3GPP TS 23.060, V7.5.0, Sep. 2007.

Office Action Issued in commonly owned U.S. Appl. No. 12/770,274, mailed Jun. 4, 2012.

Office Action issued in commonly owned U.S. Appl. No. 12/770,274, mailed Dec. 10, 2012.

Written Opinion issued in corresponding Chinese Patent Application No. 200710165462.9, mailed Aug. 10, 2012.

* cited by examiner

METHOD AND APPARATUS FOR BEARER PROCESSING

CROSS-REFERENCE TO RELATED APPLICATIONS

This application is a continuation of U.S. patent application Ser. No. 12/770,274, filed on Apr. 29, 2010, which is a continuation of International Application No. PCT/CN2008/072859, filed Oct. 28, 2008. The International Application claims priority to Chinese Patent Application No. 200710165462.9, filed Oct. 29, 2007, each of which is incorporated herein by reference in its entirety.

FIELD OF THE INVENTION

The present invention relates to a mobile communication technology, and in particular, to a method and apparatus for bearer processing.

BACKGROUND OF THE INVENTION

A universal mobile telecommunication system (UMTS) is a third generation mobile communication system that uses a wideband code division multiple access (WCDMA) air interface technology. The UMTS is usually called a WCDMA communication system. The UMTS includes a radio access network (RAN) and a core network (CN). The RAN is responsible for processing all radio access functions, while the CN is responsible for processing all voice calls and data connections in the UMTS, and switching and routing with external networks.

In the related art, in a system architecture evolution (SAE) system, a user equipment (UE) sends a Request Bearer Resource Allocation message to the network, and the request reaches a packet data network gateway (PGW) through a mobility management entity (MME) and a serving gateway (S-GW). The request may carry quality of service (QoS) information, a correlated bearer ID and a Procedure Transaction ID, wherein the QoS information is correlated with bearer resources to be allocated, the correlated bearer ID indicates a bearer correlated with and based on the allocated bearer resources, and the Procedure Transaction ID indicates a specific procedure.

After receiving the request, the PGW obtains a proper processing policy through policy and charging control (PCC) interactions with a policy and charging rules function (PCRF), or uses a local processing policy directly.

Once accepting the request, the PGW may initiate a Dedicated Bearer Activation procedure or a Dedicated Bearer Modification procedure to allocate bearer resources according to the processing policy.

In the Dedicated Bearer Activation procedure, the PGW sends a Create Dedicated Bearer Request to a downstream node, the request carries QoS information and a Procedure Transaction ID, wherein the QoS information is correlated with the bearer resources to be allocated, and the Procedure Transaction ID is used to indicate a specific procedure, when the procedure is one part of the procedure of requesting bearer resources by the UE, a Procedure Transaction ID parameter is used to correlate with the bearer resources.

In the Dedicated Bearer Modification procedure, the PGW sends an Update Dedicated Bearer Request to the downstream node, where the request carries QoS information (correlated with the bearer resources to be allocated) and a Procedure Transaction ID, wherein the Procedure Transaction ID is used to indicate a specific procedure; when the procedure is one part of the procedure of requesting bearer resources by the UE, a Procedure Transaction ID parameter is used to correlate with the bearer resources.

In the UMTS, the change of bearer resources is involved in a Packet Data Protocol (PDP) Context Activation procedure, a PDP Context Update procedure, and a Secondary PDP Context Activation procedure.

During the implementation of the present invention, the inventor discovers at least the following problems in the related art:

The UE may access the SAE system through the UMTS. That is, the UE can access the S-GW in the SAE system through the RAN and the serving general packet radio service support node (SGSN) in the UMTS. However, the UMTS and the SAE system have different procedures for bearer resource allocation, thus causing conflicts between the UMTS and the SAE system in the Bearer Resource Allocation procedures.

SUMMARY OF THE INVENTION

Embodiments of the present invention provide a method and apparatus for bearer processing to overcome the conflicts between the UMTS and the SAE system in the Bearer Resource Allocation procedure in the related art.

A method for bearer processing, comprising, receiving, by a system border node, a Packet Data Protocol (PDP) Context Request message initiated by a Universal Mobile Telecommunication System (UMTS); and adjusting, by the system border node, a Request Bearer Resource Allocation message of a System Architecture Evolution (SAE) system or a PDP Context Request message of the UMTS system according to the received PDP Context Request message, to map the Bearer Resource Allocation procedure of the SAE system and the Bearer Resource Allocation procedure of the UMTS system.

A method for bearer processing, comprising:

receiving, by a system border node, a Packet Data Protocol (PDP) Context Request message initiated by a Universal Mobile Telecommunication System (UMTS) system; and notifying, by the system border node, a System Architecture Evolution (SAE) system of the type of the PDP Context Request message, to enable the SAE system to initiate a Request Bearer Resource Allocation message with the same type of the UMTS system.

A network node, wherein the network node is located at the border between a Universal Mobile Telecommunication System (UMTS) system and a System Architecture Evolution (SAE) system, and the network node comprises a receiving unit and a adjusting unit, the receiving unit is configured to receive a Packet Data Protocol (PDP) Context Request message initiated by the UMTS system, and the adjusting unit is configured to adjust a Request Bearer Resource Allocation message of the SAE system or a PDP Context Request message of the UMTS system according to the PDP Context Request message received by the receiving unit, to map the Bearer Resource Allocation procedure of the SAE system and the Bearer Resource Allocation procedure of the UMTS system.

Compared with the prior art, embodiments of the present invention have the following merits: in the embodiments of the present invention, the Request Bearer Resource Allocation message of the SAE system or the PDP Context Request of the UMTS is adjusted, so that the Bearer Resource Allocation procedure of the SAE system and the Bearer Resource Allocation procedure of the UMTS are mapped. For example, a bearer ID may be added to the Request Bearer Resource Allocation message to adjust the message, or other types of PDP Context Request may be sent in case of inconsistency.

DETAILED DESCRIPTION OF THE INVENTION

The present invention is hereinafter described in detail with reference to exemplary embodiments and accompanying drawings.

The embodiments of the present invention is to map the Bearer Resource Allocation procedure of the UMTS and the Bearer Resource Allocation procedure of the SAE system in case of changes in the resources of the UMTS when the UE accesses the SAE system through the UMTS.

Figure 1:
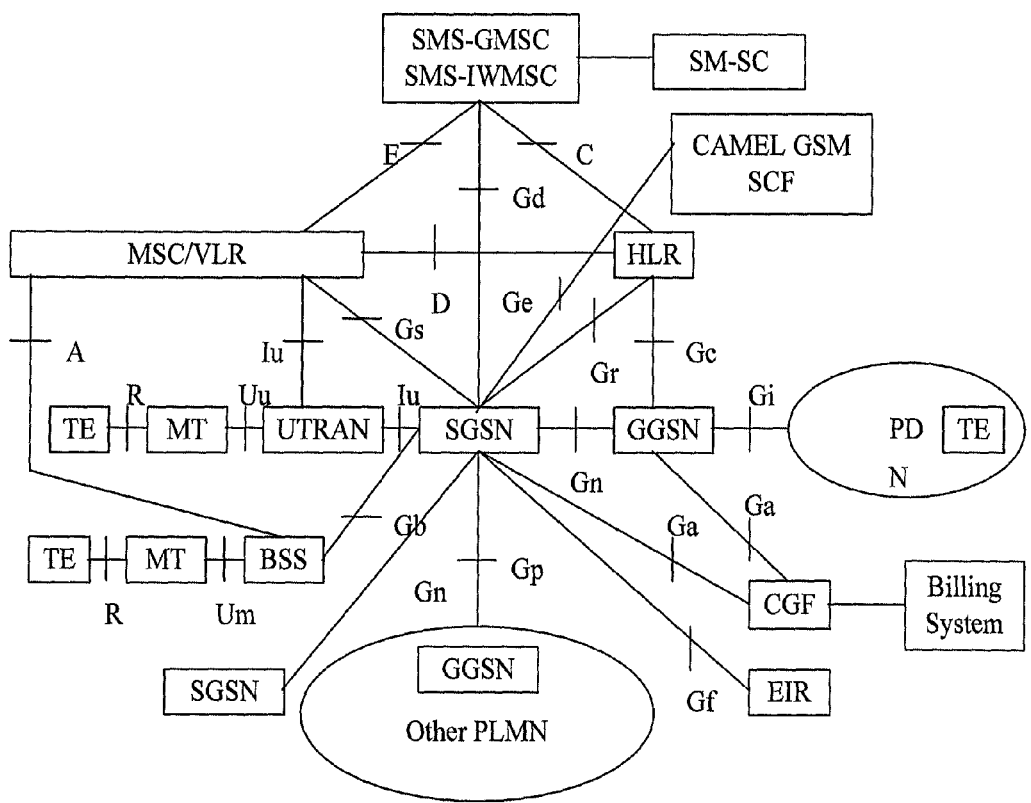
FIG. 1 shows a logical architecture of a UMTS in an embodiment of the present invention.

FIG. 1 shows a logical architecture of a UMTS in an embodiment of the present invention. The following describes main components of the UMTS.

A gateway general packet radio service support node (GGSN) is a basic NE function entity, and is used to route and encapsulate packets between external data networks. A user chooses a GGSN as a gateway according to the user's subscription information and access point requested by the user during the PDP Context Activation procedure. The GGSN is the gateway to external packet networks and provides functions such as session management.

A serving GPRS support node (SGSN) is a basic NE and is responsible for forwarding input/output Internet Protocol (IP) packets for a mobile station (MS) in a local SGSN service area. The SGSN provides the following functions: routing and forwarding of packets in a local SGSN service area, provision of services for all packet switched (PS) users in the local SGSN service area, encryption and authentication, session management, mobility management, and interfaces with the universal terrestrial radio access network (UTRAN), GGSN, and home location register (HLR).

A RAN includes a radio network controller (RNC) and a node base station (NodeB).

Figure 2:
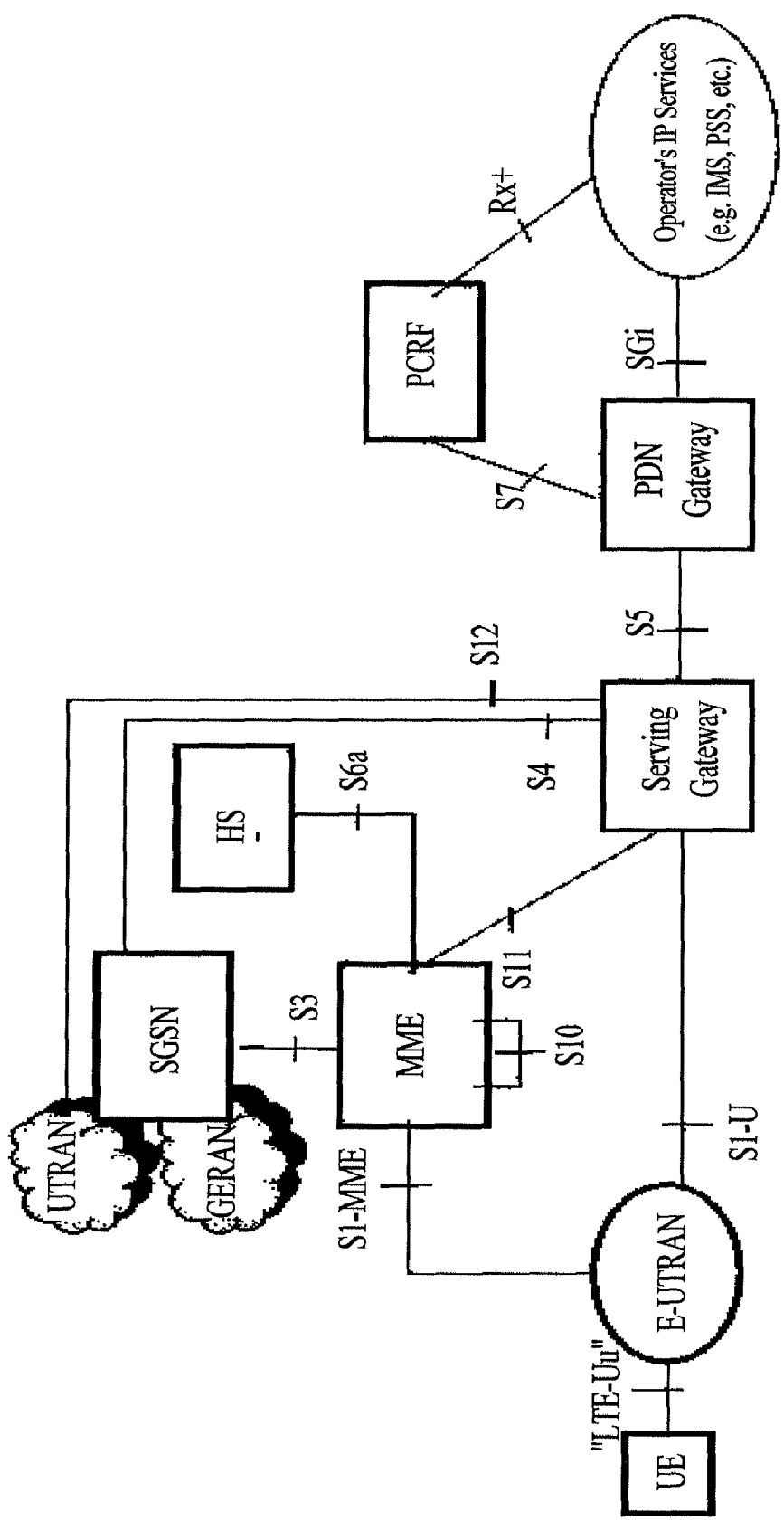
FIG. 2 shows a network architecture of an LTE/SAE system in an embodiment of the present invention.

FIG. 2 shows a network architecture of an LTE/SAE system in an embodiment of the present invention.

The following describes the SAE network architecture and its functions. An evolved packet core network includes the following components:

A MME is responsible for storing mobility management contexts of a UE, such as the user ID, mobility management status and location information, processing non access stratum (NAS) signaling, and ensuring the security of the NAS signaling.

A SAE gateway (SAE GW) includes a serving gateway (S-GW) and a PDN gateway (P-GW). The S-GW and the PG-W are two logical entities, and may be located in a same physical entity or different physical entities.

The S-GW stores user plane contexts of the UE, such as the IP address and routing information of the UE, and performs lawful interception and packet data routing. An S11 interface is used between the S-GW and the MME, and is responsible for the communication between the MME and a user plane entity (UPE) and exchange of mobility management information and session control information of the UE.

The MME is responsible for connecting to the control plane of the EUTRAN network through an S1-MME interface; the S-GW is responsible for connecting to the user plane of the EUTRAN network through an S1-U interface. In addition, the MME is connected to a 2G/3G SGSN through an S3 interface, and the S-GW is connected to a 2G /3G SGSN through an S4 interface, and the MME and the S-GW are responsible for the control plane anchor point and user plane anchor point functions of the UE moving between a 3G network and an SAE network.

The P-GW is responsible for the user plane anchor point function of a UE accessing a PDN, and communications with external PDNs through a SGi reference point. It also routes and forwards packets, and is responsible for the policy and charging enforcement function (PCEF) and packet filtering function based on users. The P-GW is connected to the S-GW through an S5 interface, transmitting such control information as bearer creation, bearer modification and bearer deletion, and routing packet data.

A PCRF transmits QoS information and PCC information to the P-GW (as the PCEF) through an S7 interface.

Figure 3A:
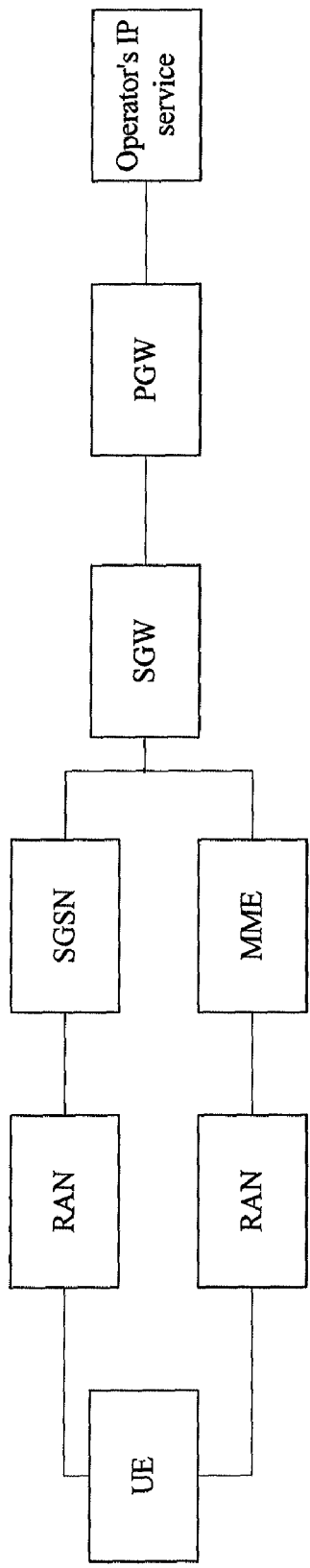
FIG. 3A is a simplified architecture of a whole SAE network in the related art.

For better description, the overall architecture of the SAE network shown in FIG. 2 may be simplified. As shown in FIG. 3A, the UE accesses the S-GW through the SGSN or through the MME. Thus, the whole network architecture may be divided into the following two parts.

Figure 3B:
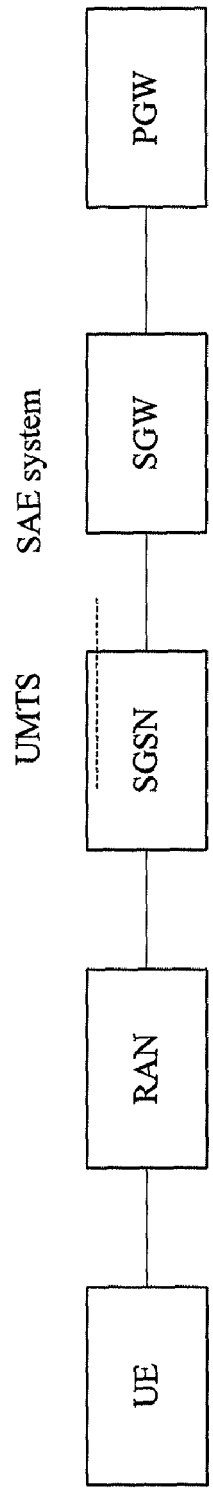
FIG. 3B shows an architecture where a UE accesses an S-GW through an SGSN after the architecture shown in FIG. 3A is disassembled.

Part 1: As shown in FIG. 3B, the UE accesses the S-GW through the SGSN. In this case, the UE, RAN and SGSN form a UMTS, while the S-GW and PGW form an SAE system.

Figure 3C:
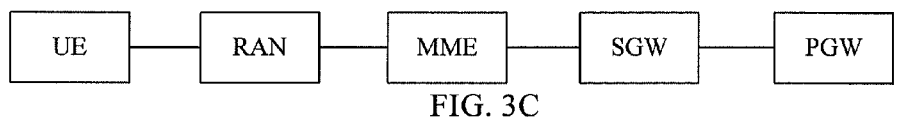
FIG. 3C shows an architecture of an SAE system after the architecture shown in FIG. 3A is disassembled.

Part 2: As shown in FIG. 3C, the UE accesses the S-GW through the MME. In this case, all the nodes belong to the SAE system.

In embodiments of the present invention, the Bearer Resource Allocation procedure of the UMTS and the Bearer Resource Allocation procedure of the SAE system may be mapped in case of changes in the resources of the UMTS, supposing the UE accesses the SAE system through the UMTS. The following describes two sets of solutions provided in embodiments of the present invention.

Solution 1: The SAE system is notified of related information indicating reasons and/or types of bearer changes, so that the SAE system can know the type of a PDP Context Request (create or update) sent from the UMTS. The SAE system may be notified through different messages, a type indication parameter in a message or some fields in a parameter. Then, the SAE system can select a proper processing mode according to the preceding information, wherein the proper processing mode may be a Dedicated Bearer Activation procedure, a Dedicated Bearer Modification procedure, or a Bearer Modification Rejection procedure. As an embodiment of the present invention, this solution is to notify the SAE system through a bearer ID carried in the Request Bearer Resource Allocation message of the SAE system. The bearer ID may be generated by the system border node through agreements with the SAE system, and be added to the Request Bearer Resource Allocation message of the SAE system by the system border node. In this embodiment, the UMTS may have an Activate Secondary PDP Context Request message or a Create PDP Context Request message, and an Update PDP Context Request message, while the SAE system has only a Request Bearer Resource Allocation message (create or modification is performed according to this request in the SAE system). Thus, only a bearer ID needs to be generated for the Activate Secondary PDP Context Request message or Update PDP Context Request. The PDP Context Request without a bearer ID may be correlated with the Request Bearer Resource Allocation message in the SAE system. For example, after receiving an Activate Secondary PDP Context Request message, the system border node generates a bearer ID for the request, and adds the bearer ID to the Request Bearer Resource Allocation message; after receiving an Update PDP Context Request, the system border node does not need to generate a bearer ID for the request, and only needs to send a Request Bearer Resource Allocation message.

Solution 2: The PDP Context Request of the UMTS is adjusted with reference to the processing mode of the SAE system because the SAE system is located at the upper side of the whole system. That is, the SAE system may not select a processing mode by referring to related information from the UMTS. If the UMTS uses a processing mode different from that selected by the SAE system, the use of the processing mode is terminated, and the processing mode of the SAE system is used instead.

The present invention involves interactions between two systems, that is, the UMTS and SAE system. Thus, the solutions must consider the agreement between these two systems and the case that the border node between these two systems is the SGSN and/or S-GW. When the border node is the SGSN, the SGSN is responsible for shielding the difference between procedures of these two systems. In this case, for the S-GW in the SAE system, the SGSN plays the role of the MME. UMTS procedures, for example, the Secondary PDP Context Activation procedure and PDP Context Modification procedure, are used between the SGSN and downstream nodes (to the UE). SAE procedures, for example, the Dedicated Bearer Activation procedure and Dedicated Bearer Modification procedure, are used between the SGSN and upstream nodes. When the border node is the S-GW, the S-GW is responsible for shielding the difference between procedures of these two systems. In this case, for the downstream nodes, the S-GW plays the role of the GGSN in the UMTS. UMTS procedures are used between the S-GW and the downstream nodes, while SAE procedures are used between the S-GW and the upstream nodes. Certainly, the SGSN and the S-GW may be used as the border node to shield the difference between these two systems. In this case, the processing mode is similar to the preceding two processing modes.

The following describes the preceding two processing modes.

Figure 4:
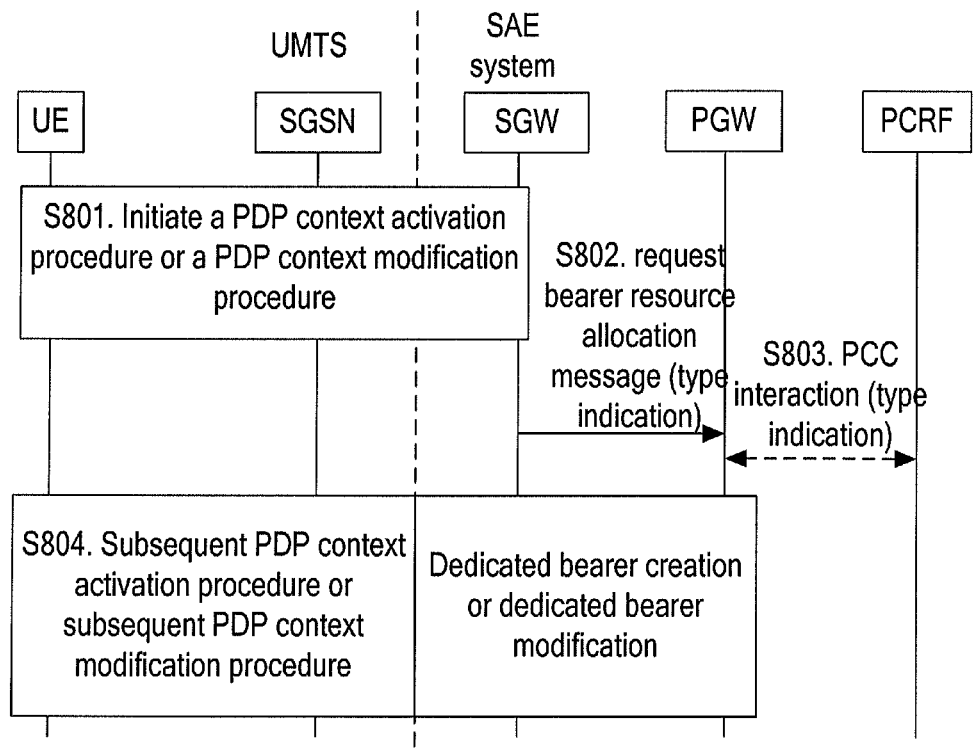
FIG. 4 shows a flowchart of mapping the procedures in systems by notifying an SAE system of related information indicating reasons or types of bearer changes in a first embodiment of the present invention.

FIG. 4 shows a flowchart of mapping the procedures of systems by notifying the SAE system of related information indicating reasons or types of bearer changes in the first embodiment of the present invention.

S801. In the UMTS, the (secondary) PDP Context Activation procedure initiated by the UE and the PDP Context Modification procedure initiated by the UE, RAN, SGSN or S-GW (when the S-GW is the system border node and needs to play the role of the GGSN) may trigger a Request Bearer Resource Allocation message to the SAE system.

S802. In this embodiment, the border node (SGSN and/or S-GW) of these two systems may notify the SAE system of related information indicating reasons and/or types of bearer changes through different messages, a type indication parameter in the message or some fields in the parameter. In this embodiment, the SAE system is notified through a bearer ID carried in the Request Bearer Resource Allocation message of the SAE system.

S803. The PGW may use the obtained information about reasons/types of bearer changes as factors for selecting a processing mode. The PGW may also select a processing mode by using the information to perform PCC interactions with the PCRF.

S804. The PGW performs subsequent procedures according to the selected processing mode, for example, Dedicated Bearer Activation procedures, Dedicated Bearer Modification procedures, and Bearer Modification Rejection procedures. The UE and the SGSN continue to perform subsequent procedures associated with S801, for example, subsequent procedures of the PDP Context Activation or PDP Context Modification.

The solution provided in this embodiment considers the case that the border node of these two systems is located in the SGSN or the S-GW. The following describes the first embodiment of the present invention with reference to special scenarios.

Figure 5:
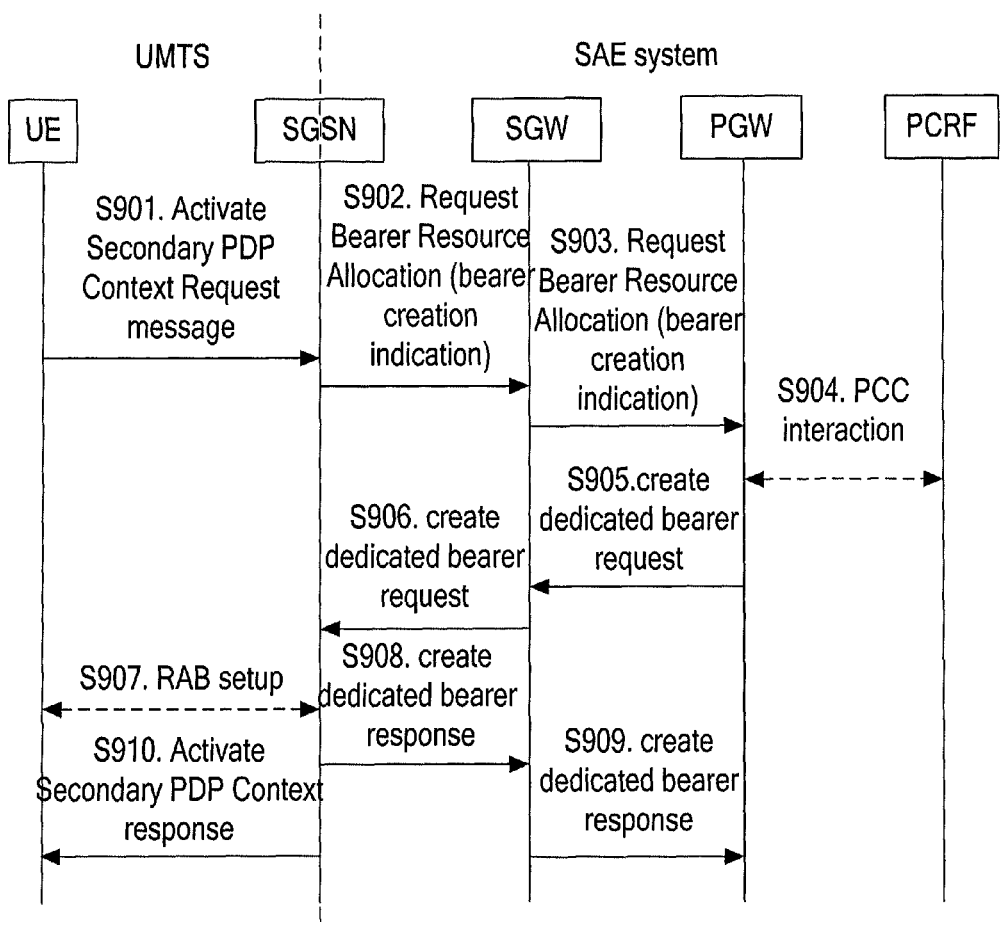
FIG. 5 shows a flowchart of initiating a secondary PDP context activation by a UE when the system border node is located on an SGSN in a second embodiment of the present invention.

The second embodiment of the present invention describes a method for initiating a secondary PDP context activation by the UE, supposing the system border node is located in the SGSN. As shown in FIG. 5, the method includes the following steps:

S901. The UE sends an Activate Secondary PDP Context Request message to the SGSN to create a resource bearer. The request carries a network layer service access point ID—Netscape server application program interface (NSAPI) parameter wherein the parameter is correlated with the bearer ID/PDP context ID, a QoS parameter correlated with required bearer resources and a Correlation Transaction ID parameter correlated with an existing bearer/PDP context.

S902. The SGSN sends a Request Bearer Resource Allocation message carrying a bearer creation indication to the S-GW. The SGSN converts the Activate Secondary PDP Context Request message into a Request Bearer Resource Allocation message, and sends the request to the PGW through the S-GW, wherein the Request Bearer Resource Allocation message carries a bearer ID, based on which the PGW can know the type of the PDP Context Request. Being the system border node, the SGSN may perform message conversion, such as converting the PDP Context Request into the Request Bearer Resource Allocation message, and perform related parameter conversions. That is, the received Activate Secondary PDP Context Request message of the UMTS may trigger the SGSN to send a Request Bearer Resource Allocation message of the SAE system to the S-GW; the SGSN may determine an existing bearer according to the received Correlation Transaction ID parameter, and carry a bearer ID in the message to indicate the existing bearer.

Because the UE has already allocated a bearer ID, such as an NSAPI parameter, the SGSN needs to convert the bearer IDs, for example, to convert the bearer ID "NSAPI" in the UMTS into the bearer ID in the SAE system, and the SGSN may convert the bearer IDs into a new bearer ID, wherein the new bearer ID is used to indicate a bearer creation indication, and send the new bearer ID to the PGW. If the SGSN sends the bearer ID to the PGW, the PGW may select a Dedicated Bearer Creation procedure according to the bearer ID. Thus, the bearer ID can act as a bearer creation indication parameter.

S903. The S-GW sends a Request Bearer Resource Allocation message to the PGW, wherein the request carries a bearer creation indication.

S904. The PGW performs PCC interactions with the PCRF, notifying the PCRF of obtained indication information during the interactions.

S905. The PGW selects a Dedicated Bearer Creation procedure correlated with a Secondary PDP Context Activation procedure in the UMTS according to the obtained indication information, local policy or PCC policy, and sends a Create Dedicated Bearer Request message to the downstream S-GW.

S906. The S-GW sends a Create Dedicated Bearer Request message to the SGSN.

In the SAE system, the Request Bearer Resource Allocation message in S902 and S903 needs to be correlated with the Create Dedicated Bearer Request message in S905 and S906. Thus, the SGSN, being the system border node, needs to allocate a Procedure Transaction ID, through which a correlation may be established.

S907. After receiving the Create Dedicated Bearer Request message, the SGSN, being the system border node, may continue the subsequent Secondary PDP Context Activation procedure with the UMTS, and set up a radio access bearer (RAB) with the UE.

S908. The SGSN returns an Update Dedicated Bearer Response to the S-GW.

S909. The S-GW returns an Update Dedicated Bearer Response to the PGW. The SAE system completes the Dedicated Bearer Creation procedures.

S910. The SGSN returns an Activate Secondary PDP Context Response to the UE.

In this embodiment, a parameter, such as a create bearer ID, is carried in the existing message when the information is transmitted to the SAE system, wherein the existing message may be a Request Bearer Resource Allocation message. In fact, other modes may also be applicable, for example, using other messages or using some fields in the existing parameters.

Figure 6:
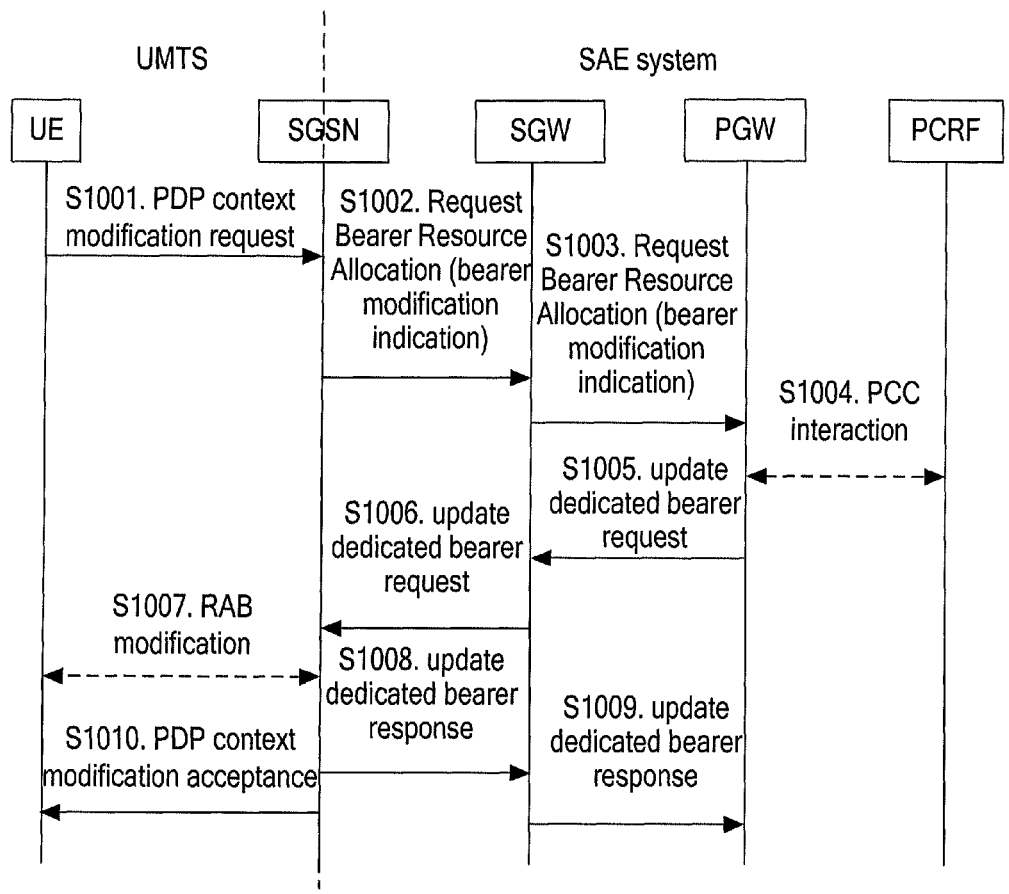
FIG. 6 shows a flowchart of initiating a PDP context modification by a UE when the system border node is located on an SGSN in a third embodiment of the present invention.

The third embodiment of the present invention describes a method for initiating a PDP context modification by the UE, supposing the system border node is located in the SGSN. As shown in FIG. 6, the method includes the following steps:

S1001. The UE sends a PDP Context Modification Request to the SGSN to modify the resource bearer. The request may carry a QoS parameter correlated with the required bearer resources and a Procedure Transaction ID parameter correlated with the bearer/PDP context to be modified.

S1002. The SGSN sends a Request Bearer Resource Allocation message to notify the PGW of modifying the bearer, wherein the request may include a bearer modification indication. The SGSN converts the PDP Context Modification Request into a Request Bearer Resource Allocation message, and sends the Request Bearer Resource Allocation message to the PGW through the S-GW, wherein the Request Bearer Resource Allocation message carries a bearer ID, through the bearer ID the PGW can know that the type of the PDP Context Request is bearer modification indication. The SGSN, being the system border node, needs to convert messages and parameters. The received PDP Context Modification Request in the UMTS may trigger the SGSN to send a Request Bearer Resource Allocation message in the SAE system to the S-GW; the SGSN may determine an existing bearer to be modified according to the received Procedure Transaction ID parameter, and carry a correlated bearer ID in the message to represent the existing bearer. The SGSN may notify the PGW of selecting a Dedicated Bearer Update procedure by carrying a bearer modification ID in the message.

S1003: The S-GW continues to send a Request Bearer Resource Allocation message to the PGW, wherein the request includes a bearer modification indication.

S1004. The PGW may perform PCC interactions with the PCRF, and notify the PCRF of obtained indication information during the interactions.

S1005. The PGW selects a Dedicated Bearer Creation procedure according to the obtained indication information, local policy or PCC policy, and sends an Update Dedicated Bearer Request to the downstream S-GW, wherein the Dedicated Bearer Creation procedure is correlated with the Secondary PDP Context Activation procedure in the UMTS.

S1006. The S-GW sends an Update Dedicated Bearer Request to the SGSN.

S1007. After receiving the Update Dedicated Bearer Request, the SGSN, being the system border node, may continue the subsequent PDP Context Modification procedure with the UMTS, and modify the RAB with the UE.

S1008. The SGSN returns an Update Dedicated Bearer Response to the S-GW.

S1009. The S-GW returns an Update Dedicated Bearer Response to the PGW. The SAE system completes the Dedicated Bearer Modification procedure.

S1010. The SGSN returns a PDP context modification acceptance message to the UE.

In the preceding embodiment, when the system border node sends a Request Bearer Resource Allocation message to the PGW according to the PDP Context Request, wherein the PDP Context Request is a Create PDP Context Request or an Update PDP Context Request, a bearer ID can be carried in the Request Bearer Resource Allocation message, so that the PGW can select a Dedicated Bearer Creation or Update procedure.

The difference between the procedures in the third embodiment and the second embodiment is as follows: A bearer creation indication is carried in the procedure in the second embodiment, while a bearer modification indication is carried in the procedure in the third embodiment.

Figure 7:
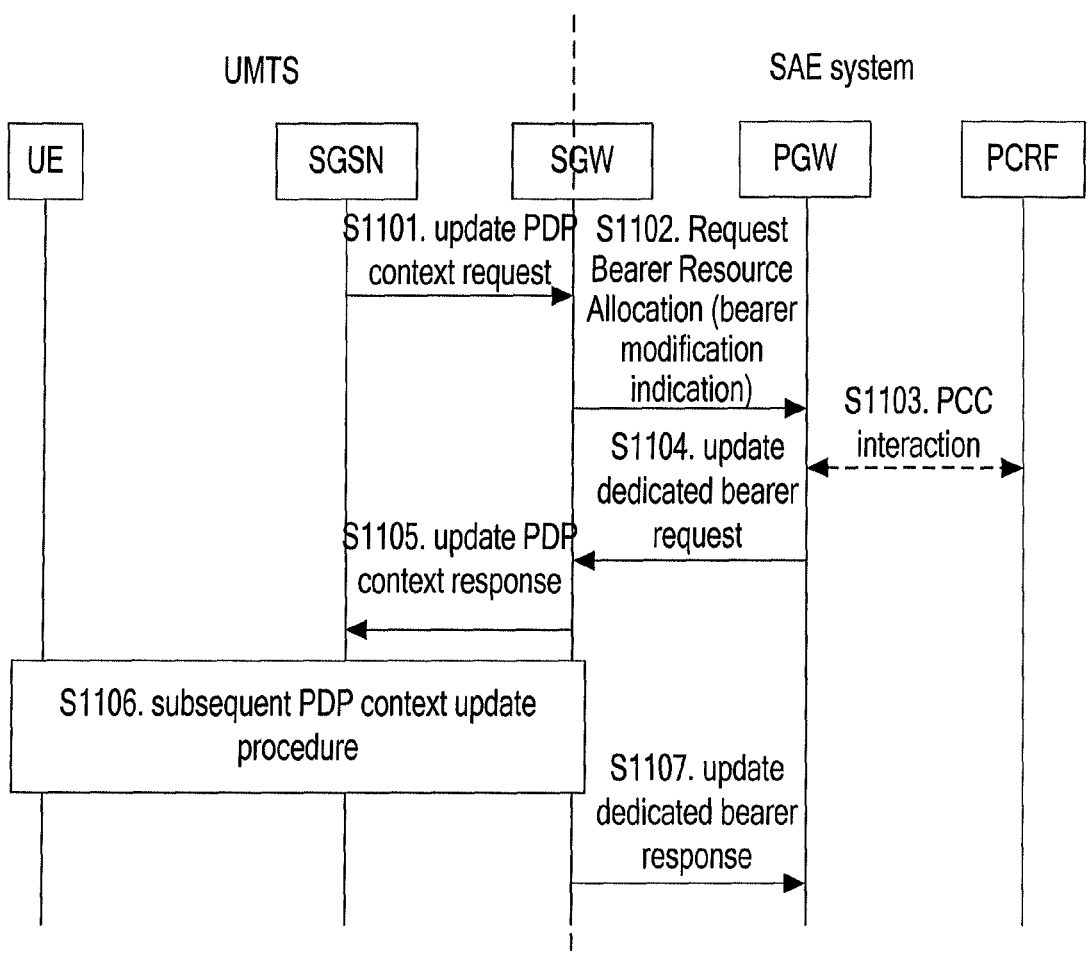
FIG. 7 shows a flowchart of initiating a PDP context modification by an SGSN when the system border node is located on an S-GW in a fourth embodiment of the present invention.

The fourth embodiment describes a method for initiating a PDP Context Modification procedure by the SGSN, supposing the system border node provided in the first embodiment is located on the S-GW. As shown in FIG. 7, the method includes the following steps:

S1101. The SGSN sends an Update PDP Context Request to the SGSN to modify the resource bearer. The request may carry a QoS parameter correlated with the required bearer resources and an original NSAPI parameter correlated with the bearer/PDP context to be modified.

S1102. The S-GW sends a Request Bearer Resource Allocation message to the PGW according to the Update PDP Context Request, where the Request Bearer Resource Allocation message carries a bearer modification ID, notifying the PGW of selecting a Dedicated Bearer Update procedure. The S-GW, being the system border node, performs message conversion and parameter conversion. The Update PDP Context Request in the UMTS may trigger the S-GW to send a Request Bearer Resource Allocation message in the SAE system to the PGW. The S-GW may determine an existing bearer to be modified according to the received original NSAPI parameter, and carry a correlated bearer ID, such as bearer modification ID, in the Request Bearer Resource Allocation message to represent the existing bearer. The S-GW may notify the PGW of selecting a Dedicated Bearer Update procedure by carrying a bearer modification indication parameter in the message.

In the SAE system, the Request Bearer Resource Allocation message in S1102 needs to be correlated with the Update Dedicated Bearer Request in S1104 (like the Procedure Transaction ID in the prior art). Thus, the S-GW, being the system border node, needs to allocate a Procedure Transaction ID for establishing a correlation between S1102 and S1104.

S1103. The PGW may perform PCC interactions with the PCRF, and notify the PCRF of obtained indication information during the interactions.

S1104. The PGW selects a Dedicated Bearer Update procedure correlated with the PDP Context Modification procedure in the UMTS according to the obtained indication information, local policy or PCC policy, and sends an Update Dedicated Bearer Request to the S-GW.

S1105. After receiving the Update Dedicated Bearer request, the S-GW, being the system border node, continues the subsequent Bearer Update procedure in the UMTS, and sends an Update PDP Context Response to the SGSN.

S1106. The subsequent PDP Context Update procedure is completed in the UMTS.

S1107. The S-GW returns an Update Dedicated Bearer Response to the PGW, completing the Update procedure in the SAE system.

The following describes the second solution of the present invention in detail with reference to specific scenarios.

Figure 8:
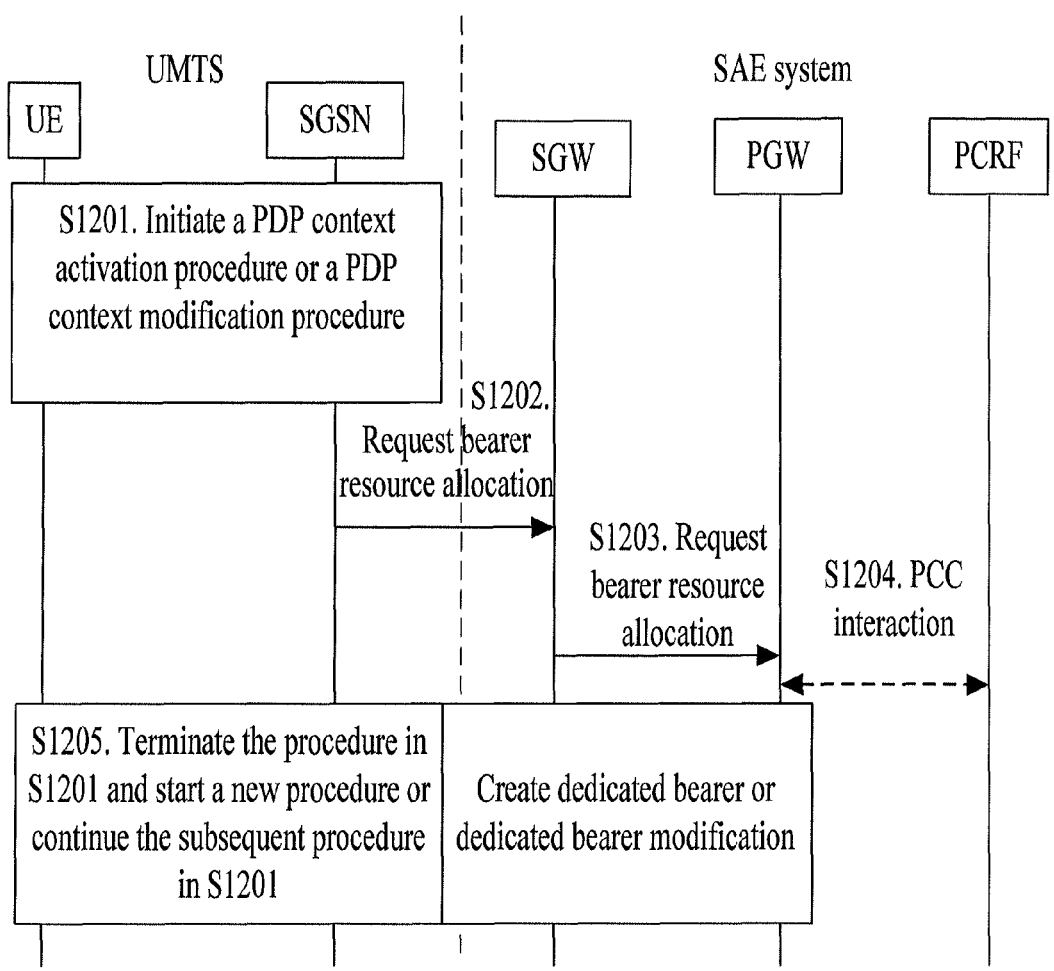
FIG. 8 shows a flowchart in which a UMTS performs procedure according to a processing mode selected by an SAE system in an embodiment of the present invention.

FIG. 8 shows a processing solution of the UMTS according to a processing mode selected by the SAE system. The processing solution includes the following steps:

S1201. In the UMTS, the UE initiates a (secondary) PDP Context Activation procedure, or the UE, RAN, SGSN or S-GW (when the S-GW acts as the system border node and needs to play the role of the GGSN) initiates a PDP Context Modification procedure to request the SAE system to allocate bearer resources.

S1202 to S1203. The system border node (SGSN or S-GW) sends a Request Bearer Resource Allocation message to the SAE system.

S1204. The PGW selects a processing mode by performing PCC interactions with the PCRF.

S1205. The PGW continues the subsequent procedure according to the selected processing mode, for example, Dedicated Bearer Creation procedure, Dedicated Bearer Modification procedure and/or Bearer Modification Rejection procedure. When the system border node (SGSN or S-GW) finds that the procedure of the SAE system does not match the procedure initiated by the UMTS, the system border node may terminate the procedure initiated by the UMTS, and the UMTS uses a new procedure correlated with the SAE system. When the system border node thinks that the procedures of the two systems are correlated, the procedure continues.

Figure 9:
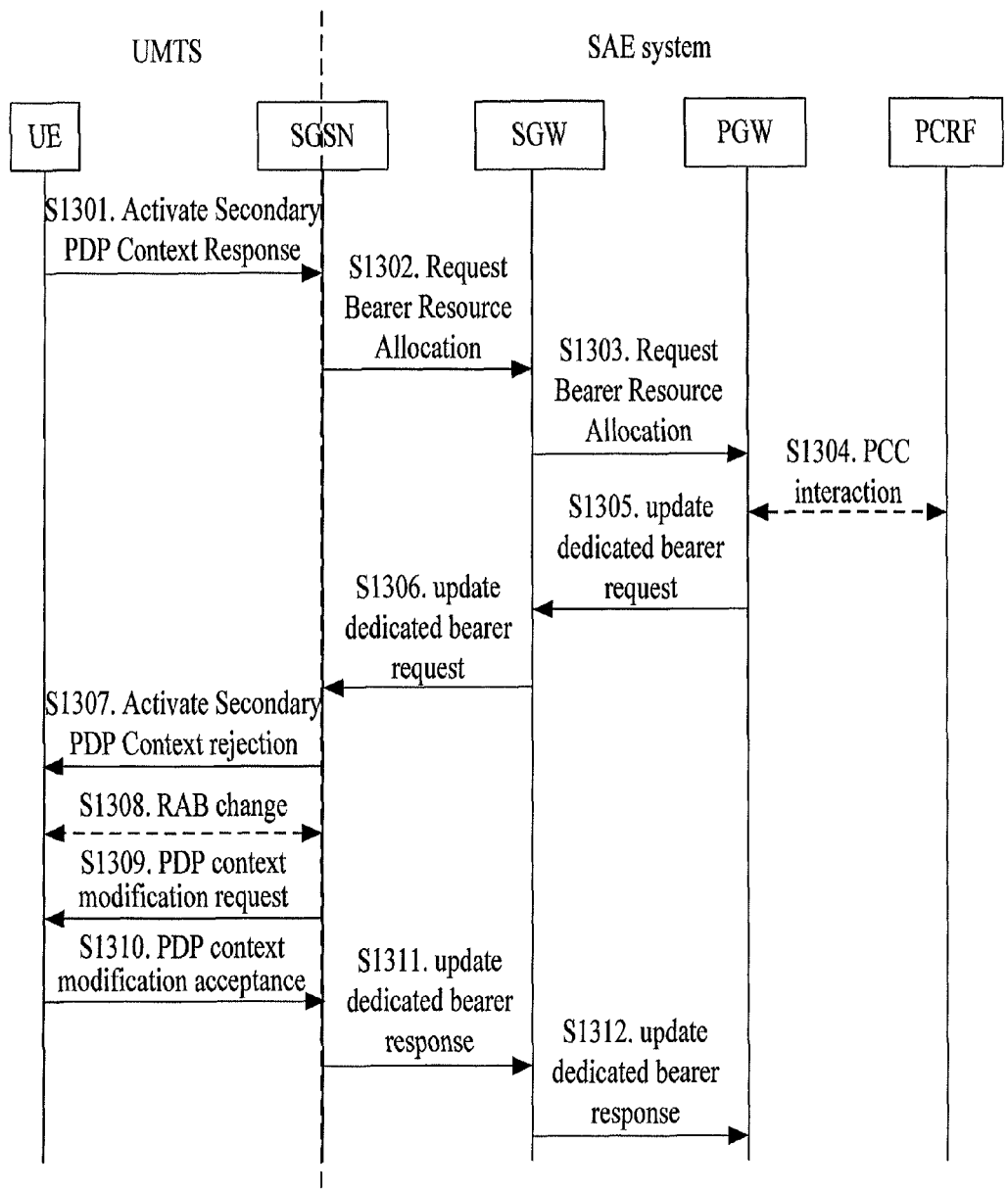
FIG. 9 shows a flowchart of initiating a secondary PDP context activation by a UE when the system border node is located on an SGSN in a fifth embodiment of the present invention.

The fifth embodiment provides a solution for initiating a secondary PDP context activation by the UE, supposing the system border node provided in the second solution is located on the SGSN. As shown in FIG. 9, the solution includes the following steps:

S1301. The UE sends an Activate Secondary PDP Context Request message to the SGSN.

S1302. The SGSN, being the system border node, sends a Request Bearer Resource Allocation message correlated with the received Activate Secondary PDP Context Request message to the S-GW.

S1303. The S-GW forwards the request to the PGW.

S1304. The PGW may perform PCC interactions with the PCRF.

S1305. The PGW may select a procedure according to a local policy or a PCC policy. In this embodiment, a Dedicated Bearer Update procedure is selected, and an Update Dedicated Bearer Request is sent to the S-GW.

S1306. The S-GW sends the Update Dedicated Bearer Request to the SGSN.

S1307. After receiving the Update Dedicated Bearer Request, the SGSN, being the system border node, finds that the request does not match the Secondary PDP Context Activation procedure initiated by the UE. Thus, the SGSN returns a secondary PDP context activation reject message to the UE to terminate the UMTS procedure.

S1308. The SGSN, being the system border node, uses a procedure correlated with the dedicated bearer update in the UMTS, and initiates a Bearer Update procedure to the UMTS to modify the RAB with the UE.

S1309 to S1310. The subsequent Bearer Modification procedure is completed in the UMTS.

S1311 to S1312. The subsequent Bearer Update procedure is completed in the SAE system.

Figure 10:
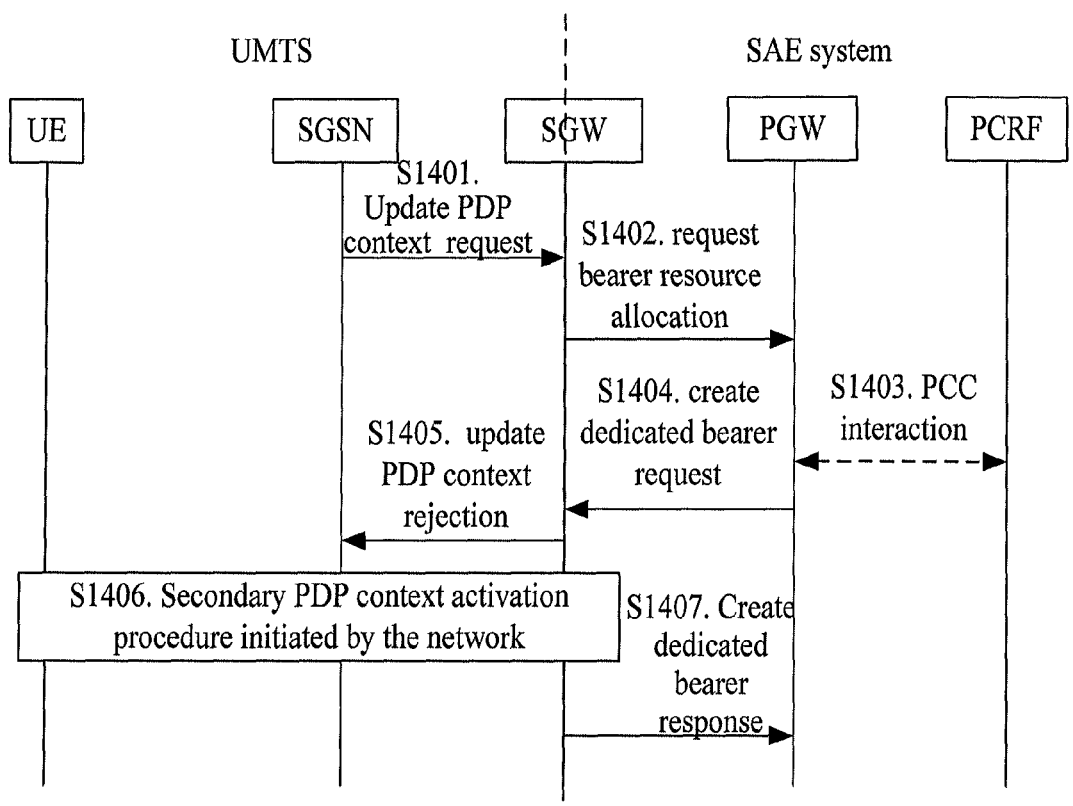
FIG. 10 shows a flowchart of initiating a PDP context update by an SGSN when the system border node is located on an S-GW in a sixth embodiment of the present invention.

The sixth embodiment provides a solution for initiating a PDP context update by the SGSN, supposing the system border node provided in the second solution is located on the S-GW. As shown in FIG. 10, the solution includes the following steps:

S1401. The SGSN sends an Update PDP Context Request to the S-GW.

S1402. The S-GW, being the system border node, sends a Request Bearer Resource Allocation message correlated with the received Update PDP Context Request to the PGW.

S1403. The PGW may perform PCC interactions with the PCRF.

S1404. The PGW may select a procedure according to a local policy or a PCC policy. In this embodiment, a Dedicated Bearer Creation procedure is selected, and a Create Dedicated Bearer Request is sent to the downstream S-GW.

S1405. After receiving the Create Dedicated Bearer Request, the S-GW, being the system border node, finds that the request does not match the PDP Context Update procedure initiated by the SGSN. Thus, the S-GW returns a PDP context update reject message to the SGSN to terminate the UMTS procedure.

S1406. The SGSN, being the system border node, uses a procedure correlated with the Dedicated Bearer Creation procedure in the UMTS, and initiates a Secondary PDP Context Activation procedure to the UMTS.

S1407. The subsequent Bearer Creation procedure is completed in the SAE system.

Figure 11:
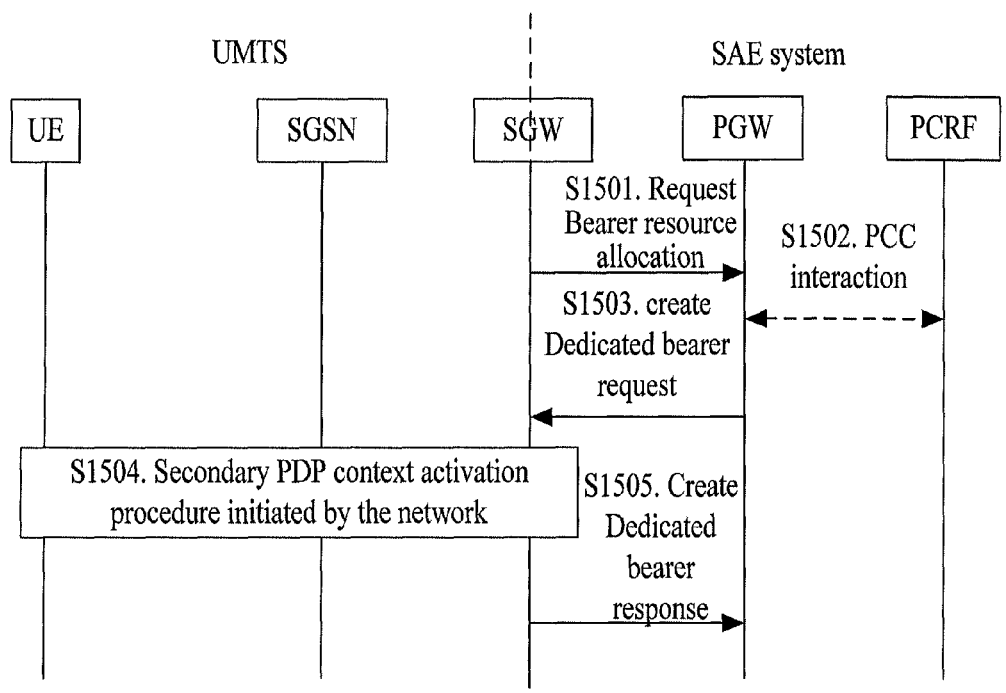
FIG. 11 shows a flowchart of initiating a PDP context update by a GGSN (S-GW) when the system border node is located on an S-GW in a seventh embodiment of the present invention.

The seventh embodiment provides a solution for initiating a PDP context update by the GGSN (S-GW), supposing the system border node provided in the second solution is located on the S-GW. As shown in FIG. 11, the solution includes the following steps:

S1501. When the S-GW acts as the system border node, the S-GW may initiate a PDP Context Update procedure in the UMTS because the S-GW has the functions of the GGSN. In this case, the S-GW may send a Request Bearer Resource Allocation message to the PGW.

S1502. The PGW may perform PCC interactions with the PCRF.

S1503. The PGW may select a procedure according to a local policy or a PCC policy. In this embodiment, a Dedicated Bearer Creation procedure is selected, and a Create Dedicated Bearer Request is sent to the downstream S-GW.

S1504. After receiving the Create Dedicated Bearer Request, the S-GW finds that the request does not match the PDP Context Update procedure that the S-GW wants to initiate. However, the S-GW does not need to terminate the procedure through an explicit message because the procedure does not begin. In this case, the S-GW may use a procedure correlated with the Dedicated Bearer Activation procedure in the UMTS to initiate a Secondary PDP Context Activation procedure to the UMTS.

S1505. The subsequent Bearer Activation procedure is completed in the SAE system.

In the preceding embodiment, when the system border node finds that the procedure of the SAE system does not match the procedure initiated by the UMTS, the system border node may terminate the procedure initiated by the UMTS and use a new procedure correlated with the SAE system in the UMTS, so that the Bearer Resource Allocation procedure of the SAE system and the Bearer Resource Allocation procedure of the UMTS can be mapped.

Figure 12:
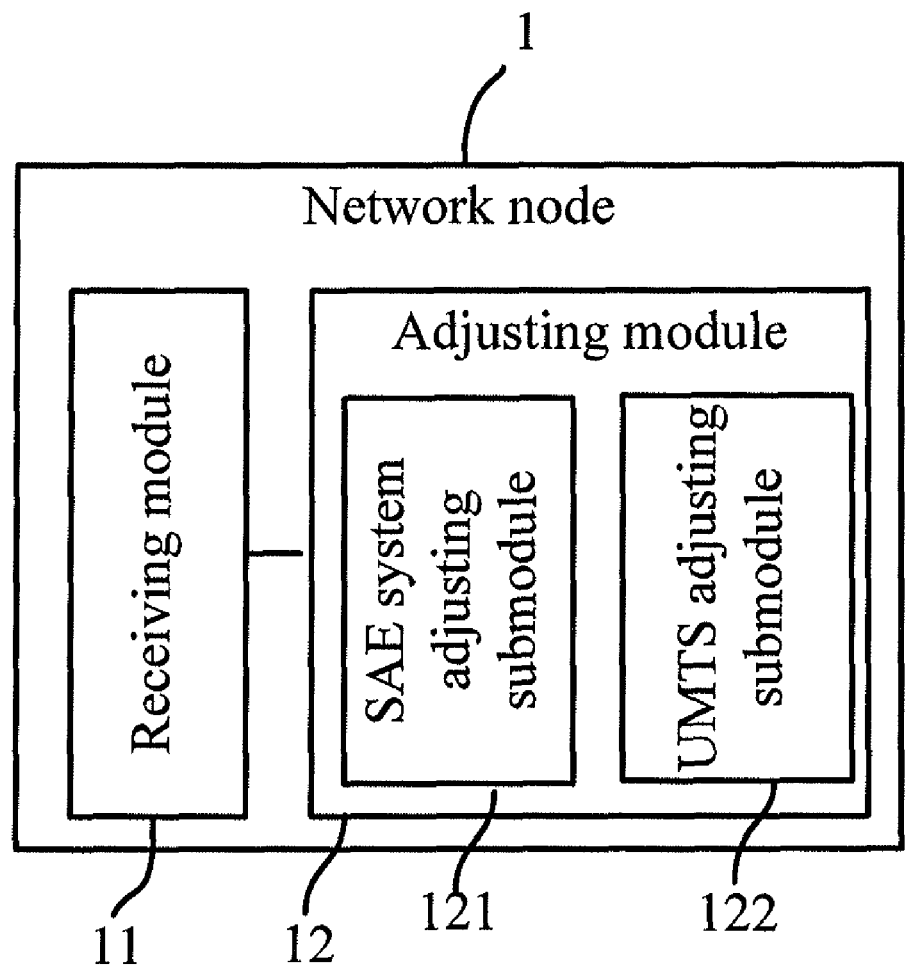
FIG. 12 shows a structure of a network node in an embodiment of the present invention.

FIG. 12 shows a structure of a network node provided in an embodiment of the present invention. The network node 1 is located at the border of the UMTS and the SAE system, which may be the SGSN and/or S-GW. The network node 1 includes a receiving module 11 and an adjusting module 12, wherein the receiving module 11 is configured to receive a PDP Context Request initiated by the UMTS; and the adjusting module 12 is configured to adjust the Request Bearer Resource Allocation message of the SAE system or PDP Context Request of the UMTS according to the PDP Context Request received by the receiving module to map the Bearer Resource Allocation procedure of the SAE system and the Bearer Resource Allocation procedure of the UMTS.

The adjusting module 12 may include an SAE system adjusting submodule 121, used to notify the SAE system of the Request Bearer Resource Allocation message according to the type of a PDP Context Request initiated by the UMTS so that the SAE system can initiate a same type of Request Bearer Resource Allocation message as the UMTS.

The adjusting module includes a UMTS adjusting submodule 122, used to judge whether the processing result returned by the SAE system is the same as the result requested in the PDP Context Request received by the receiving module 11. If the results are different, the system border node returns a reject message to the UMTS to notify the UMTS of retransmitting a different type of PDP Context Request.

Through the preceding description of embodiments of the present invention, it is understandable to those skilled in the art that embodiments of the present invention may be implemented by hardware or by software in combination with a necessary hardware platform. Thus, the technical solution of the present invention may be made into software. The software may be stored in a non-volatile storage medium (for example, a CD-ROM, a USB disk, and a mobile hard disk), and include several instructions that instruct a computer device (personal computer, server, or network device) to perform the methods provided in each embodiment of the present invention.

Although the present invention has been described through several exemplary embodiments, the invention is not limited to such embodiments. The invention is intended to cover the modifications and variations provided that they fall in the scope of protection defined by the following claims or their equivalents.

What is claimed is:

1. A method for bearer processing when a user equipment accesses a System Architecture Evolution (SAE) system through a Universal Mobile Telecommunication System (UMTS), comprising, receiving, by a system border node, a Packet Data Protocol (PDP) Context Request message initiated by the UMTS; and initiating, by a system border node, a Bearer Resource Allocation procedure of the SAE system according to the received PDP Context Request message to map the Bearer Resource Allocation procedure of the SAE system and a Bearer Resource Allocation procedure of the UMTS system;

wherein the initiating a Bearer Resource Allocation procedure of the SAE system comprises:

adjusting, by the system border node, a Request Bearer Resource Allocation message of the SAE system or a PDP Context Request message of the UMTS system according to the received PDP Context Request message wherein the adjusting, by the system border node, a Request Bearer Resource Allocation message of an SAE system according to the received PDP Context Request message comprises:

notifying, by the system border node, a Request Bearer Resource Allocation message to the SAE system, wherein the Request Bearer Resource Allocation message comprises the type of the PDP Context Request message.

2. The method according to claim 1, wherein the type of the PDP Context Request message comprises: a type of Create PDP Context Request message and a type of Update PDP Context Request message.

3. The method according to claim 1, wherein the notifying, by the system border node, the Request Bearer Resource Allocation message to the SAE system comprises:

transforming, by the system border node, the PDP Context Request message initiated by the UMTS system into the Request Bearer Resource Allocation message.

4. The method according to claim 3, wherein the transforming, by the system border node, the PDP Context Request message initiated by the UMTS system into the Request Bearer Resource Allocation message comprises:

if the PDP Context Request message initiated by the UMTS system is a Create PDP Context Request message, generating, by the system border node, a bearer ID for the Request Bearer Resource Allocation message to indicate the type of the PDP Context Request message initiated by the UMTS system, and adding the bearer ID to the Request Bearer Resource Allocation message; and if the PDP Context Request message initiated by the UMTS system is an Update PDP Context Request message, sending, by the system border node, a normal Request Bearer Resource Allocation message.

5. The method according to claim 1, further comprising:
transforming, by the system border node, the parameter of the PDP Context Request message initiated by the UMTS system into a parameter of the Request Bearer Resource Allocation message; and
allocating, by the system border node, a Procedure Transaction ID for the Request Bearer Resource Allocation message.

6. The method according to claim 1, wherein the adjusting, by the system border node, a PDP Context Request message of the UMTS system according to the PDP Context Request message initiated by the UMTS system comprises:
determining, by the system border node, whether a processing result sent from the SAE system matches a result requested by the PDP Context Request message initiated by the UMTS system; and
if the results do not match, returning, by the system border node, a reject message to the UMTS system to notify the UMTS system of resending a PDP Context Request message of a type different from the PDP Context Request message initiated by the UMTS system.

7. The method according to claim 6, wherein determining, by the system border node, whether a processing result sent from the SAE system matches a result requested by the PDP Context Request message initiated by the UMTS system comprises:
if the PDP Context Request message received by the system border node is a Create PDP Context Request message, and the processing result sent by the SAE system is an Update Dedicated Bearer Request message sent from a PGW, determining that the results do not match; or
if the PDP Context Request message received by the system border node is an Update PDP Context Request message, and the processing result sent by the SAE system is a Create Dedicated Bearer Request message sent from a PGW, determining that the results do not match.

8. The method according to claim 6, wherein the returning, by the system border node, a reject message to the UMTS system to notify the UMTS system of resending a PDP Context Request message of a type different from the PDP Context Request message initiated by the UMTS system comprises:
sending, by the system border node, a create PDP context reject message to the UMTS system, and notifying the UMTS system of sending an Update PDP Context Request message, if the PDP Context Request message initiated by the UMTS system is a Create PDP Context Request message; or
sending, by the system border node, an update PDP context reject message to the UMTS system, and notifying the UMTS system of sending an Update PDP Context Request message, if the PDP Context Request message initiated by the UMTS system is an Update PDP Context Request message.

9. The method according to claim 1, wherein the system border node is at least one of a serving general packet radio service support node (SGSN) and a serving gateway (S-GW).

10. The method according to claim 1, wherein the PDP Context Request message initiated by the UMTS system is initiated by UE, RAN or SGSN of the UMTS system.

11. A method for bearer processing when a user equipment accesses a System Architecture Evolution (SAE) system through a Universal Mobile Telecommunication System (UMTS), comprising:

receiving, by a system border node, a Packet Data Protocol (PDP) Context Request message initiated by the UMTS; and
initiating, by a system border node, a Bearer Resource Allocation procedure of the SAE system according to the received PDP Context Request message to map the Bearer Resource Allocation procedure of the SAE system and a Bearer Resource Allocation procedure of the UMTS system;
wherein the initiating a Bearer Resource Allocation procedure of the SAE system comprises:
notifying, by the system border node, the SAE system of the type of the PDP Context Request message, to enable the SAE system to initiate a Request Bearer Resource Allocation message with the same type of the UMTS system;
wherein the notifying, by the system border node, an SAE system of the type of the PDP Context Request message comprises: transforming, by the system border node, the PDP Context Request message into the Request Bearer Resource Allocation message; sending a Request Bearer Resource Allocation message to the SAE system; wherein the Request Bearer Resource Allocation message comprises the type of the PDP Context Request message.

12. The method according to claim 11, wherein the transforming, by the system border node, the PDP Context Request message into a Request Bearer Resource Allocation message comprises:
if the PDP Context Request message is a Create PDP Context Request message, generating, by the system border node, a bearer ID for the Request Bearer Resource Allocation message to indicate the type of the PDP Context Request message, and adding the bearer ID to the Request Bearer Resource Allocation message; or
if the PDP Context Request message is an Update PDP Context Request message, sending, by the system border node, a normal Request Bearer Resource Allocation message.

13. The method according to claim 11, further comprising:
transforming, by the system border node, a parameter of the PDP Context Request message into a parameter of the Request Bearer Resource Allocation message; and
allocating, by the system border node, a Procedure Transaction ID for the Request Bearer Resource Allocation message.

14. A network node, wherein the network node is located at the border between a Universal Mobile Telecommunication System (UMTS) system and a System Architecture Evolution (SAE) system, and the network node communicates with a user equipment accessing the SAE system through the UMTS, wherein the network node comprises a receiving unit and a adjusting unit,
wherein the receiving unit is configured to receive a Packet Data Protocol (PDP) Context Request message initiated by the UMTS system, and
wherein the adjusting unit is configured to initiate a Bearer Resource Allocation procedure of the SAE system according to the received PDP Context Request message to map the Bearer Resource Allocation procedure of the SAE system and a Bearer Resource Allocation procedure of the UMTS system, wherein the the initiating a Bearer Resource Allocation procedure of the SAE system comprises: adjusting a Request Bearer Resource Allocation message of the SAE system or a PDP Context Request message of the UMTS system according to the PDP Context Request message received by the receiving unit;

wherein the adjusting unit comprises: an SAE system adjusting sub module, configured to notify a Request Bearer Resource Allocation message to the SAE system, wherein the Request Bearer Resource Allocation message comprises the type of the PDP Context Request message.

15. The network node according to claim 14, wherein the adjusting unit comprises:

a UMTS system adjusting submodule, configured to judge whether the processing result returned by the SAE system is the same as the result which is requested by the PDP Context Request message received by the receiving unit or not, and configured to return a reject message to the UMTS system to notify the UMTS system of resending a PDP Context Request message of a type different from the PDP Context Request message received by the receiving unit, if the results are not the same.

16. The network node according to claim 14, wherein the network is at least one of a serving general packet radio service support node (SGSN) and a serving gateway (S-GW).

* * * * *

UNITED STATES PATENT AND TRADEMARK OFFICE
CERTIFICATE OF CORRECTION

PATENT NO. : 8,369,288 B2
APPLICATION NO. : 13/355059
DATED : February 5, 2013
INVENTOR(S) : Jinyi Zhou et al.

Page 1 of 1

It is certified that error appears in the above-identified patent and that said Letters Patent is hereby corrected as shown below:

In the Claims

In column 14, claim 14, line 64, after "UMTS system, wherein" delete "the" (first occurrence).

Signed and Sealed this
Seventh Day of May, 2013

Teresa Stanek Rea
*Acting Director of the United States Patent and Trademark Office*